Aug. 8, 1967 C. W. KERNS 3,335,401
NOISE-FILTERED DETECTION OF MARINE SEISMIC SIGNALS
Filed Jan. 7, 1966
3 Sheets-Sheet 1
FIG. 1
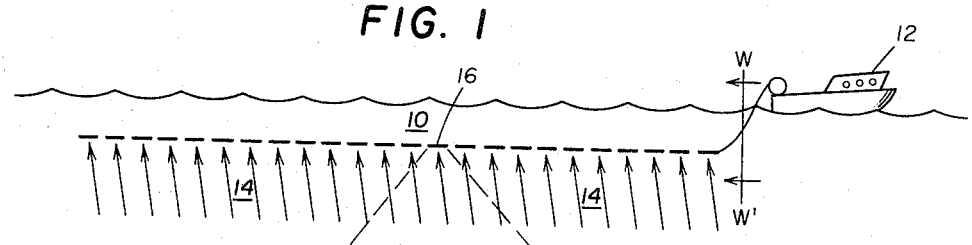
FIG. 2
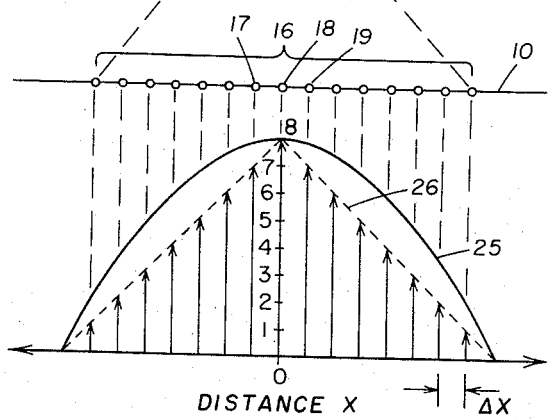
FIG. 3
FIG. 4
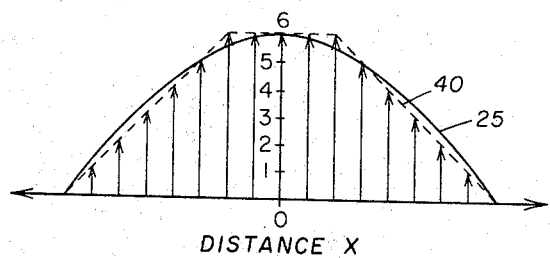
FIG. 5
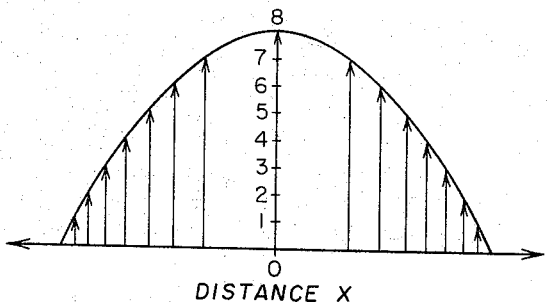
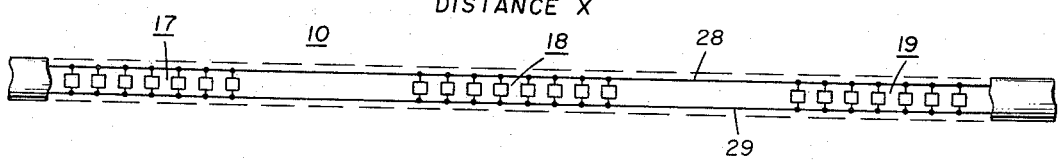
FIG. 6

Aug. 8, 1967 C. W. KERNS 3,335,401
NOISE-FILTERED DETECTION OF MARINE SEISMIC SIGNALS
Filed Jan. 7, 1966 3 Sheets-Sheet 3
FIG. 16
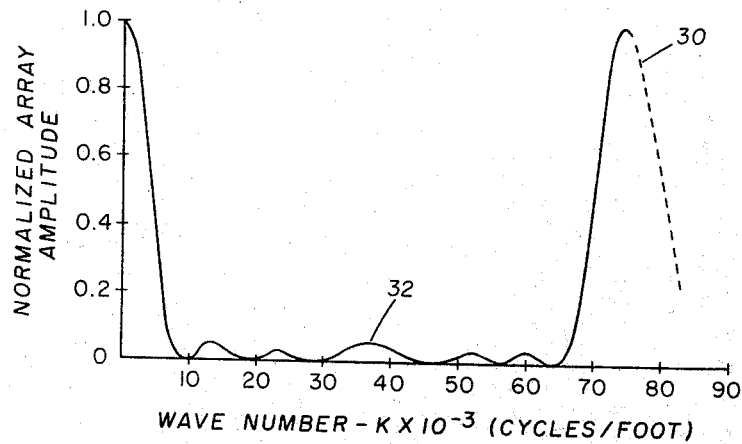
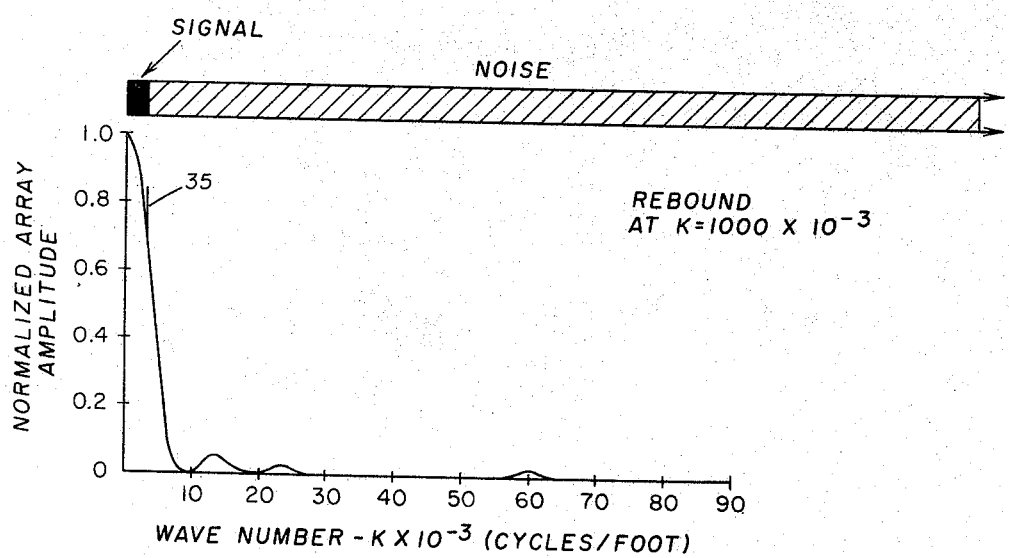
FIG. 17

United States Patent Office 3,335,401
Patented Aug. 8, 1967

3,335,401
NOISE-FILTERED DETECTION OF MARINE
SEISMIC SIGNALS
Clyde W. Kerns, Irving, Tex., assignor to Mobil Oil
Corporation, a corporation of New York
Filed Jan. 7, 1966, Ser. No. 519,200
8 Claims. (Cl. 340—7)

This invention relates to the attenuation of horizontally traveling noise in marine seismic exploration and, more particularly, to a method and apparatus for detecting seismic waves produced in a marine seismic exploration system in such a manner as to produce sharp rejection of horizontally traveling noise waves over a wide frequency band.

It has been known for some time in the seismic art to use patterns of multiple seismometers connected together to form a single channel for the elimination of horizontally traveling noise. It can be shown by statistical analysis that the method of connecting together multiple seismometers with random distributions for a single output channel results in an improvement in the signal-to-RMS noise ratio of about the square root of the number of detectors. Only in recent years, however, has it been realized that improvements greater than the square root of the number of detectors can be achieved by suitable choice of the overall length of the arrays, the spacing between each element of the array, and the sensitivity of each element in the array.

The design of multielement arrays is analogous to the design of filters. Patterns or arrays are no more than time-domain filters. That is, they provide delayed and weighted output signals which are combined to produce some desired frequency response. It may be appreciated then that the design criteria of the above-mentioned parameters of the pattern are extremely important.

In the prior art, it is already known to use multiple seismometers or detectors arranged in a pattern on land such that there is tapered weighting or sensitivity in some preferred direction. In one case, the tapering of an array taught by the prior art begins with a maximum at the center of the array and tapers uniformly and linearly to a minimum at each end of the array. In the prior art also, there are several known techniques of achieving different sensitivities for the detector elements spaced along a pattern. One technique is to use an attenuator pad or other voltage attenuating means connected to the output of each detector of equal sensitivity to give some desired output sensitivity value. The most practical technique known, however, is to group different numbers of detectors of equal sensitivity at a plurality of placement points along the earth, with the number of detectors at each placement point being proportional to the amplitude of the desired weighting function.

Until my invention, as far as I know, weighted arrays have never been applied to marine seismic cables. Marine seismic work presents a peculiar problem not usually found in the case of land exploration. This problem is the high frequency of some of the horizontally traveling noise generated by the seismic source and the recording boat. In the case of land work, high frequency, horizontally traveling noise waves are usually attenuated by the earth's crust before they reach the detector spread. However, these high frequency waves are not attenuated to as great an extent by travel through the water at water velocity.

Therefore, this invention provides an array of seismic detectors for use in marine detector cables with different numbers of detectors grouped around weighting points and spaced longitudinally from each other to achieve better sampling of the noise waves for each weighting point.

With this novel weighted array for marine cables, high frequency, as well as low frequency, horizontally traveling noise waves are attenuated.

In accordance with the method of my invention, seismic waves, which are generated downwardly from a source location, are reflected from subsurface horizons and are detected at at least one detector station located along a marine seismic detector cable. The detecting is accomplished at the detector station in a main array including a plurality of spaced-apart subarrays. The subarrays are so arranged that each subarray response attenuates high frequency, horizontally traveling noise waves. In addition, the main array, comprised of the subarrays, is arranged such that the response of the main array passes the reflected seismic waves and attenuates the relative low frequency, horizontally traveling noise waves. The output signals of all of the subarrays are combined to produce a single signal or trace representative of the reflected seismic waves and free of horizontally traveling noise waves of both high and low frequency. Finally, the amplitude of the combined signal is recorded as a trace with respect to time.

In accordance with a specific aspect of the apparatus of my invention, there is provided a marine seismic cable with an improved detector arrangement for each detector station. A plurality of detectors of equal sensitivity are located along the cable in a main array made up of a plurality of spaced-apart subarrays of detectors with equal distances between the centers of the subarrays. The number of the detectors within each subarray is a maximum near the center of the main array and tapers linearly to a minimum near each end of the main array. The detectors within each subarray are equally spaced longitudinally one from the other a distance such that each subarray response attenuates high frequency, horizontally traveling noise waves. The length of the main array is such that the response of the main array passes the reflected waves and attenuates the relative low frequency, horizontally traveling noise waves. The outputs of all of the detectors are combined to produce a single signal representative of the reflected seismic waves and free of horizontally traveling noise waves of both high and low frequency.

Using a marine seismic cable constructed in accordance with my invention, there was an 18-decibel reduction of horizontally traveling noise waves greater than 25 cycles per second compared to a cable with equally spaced detectors, each of equal sensitivity.

A further advantage of the invention is that noise is attenuated without phase distortion of the signal.

For further advantages and a better understanding of my invention, reference will now be made to the following detailed description and accompanying drawings in which:

FIGURE 1 illustrates the method of my invention;

FIGURE 2 illustrates one detecting station used in the method illustrated by FIGURE 1;

FIGURE 3 illustrates one weighting function, a triangular weighting function, which may be used in the invention;

FIGURE 4 illustrates a trapezoidal weighting function which can be used in the invention;

FIGURE 5 illustrates a weighting function which can be achieved by unequal spacing between the subarrays of detectors;

FIGURE 6 is a diagrammatic illustration of the central portion of a marine seismic cable including an array with sensitivity according to the triangular weighting function of FIGURE 3;

FIGURE 16 illustrates the response curve of FIGURE 15 in more detail near the low wave number portion of the curve; and FIGURE 17 illustrates the response curve of the triangular weighted main array made up of the plurality of spaced-apart subarrays.

Figures 7, 8, 9, 10, 11, 12, 13, 14, 15:
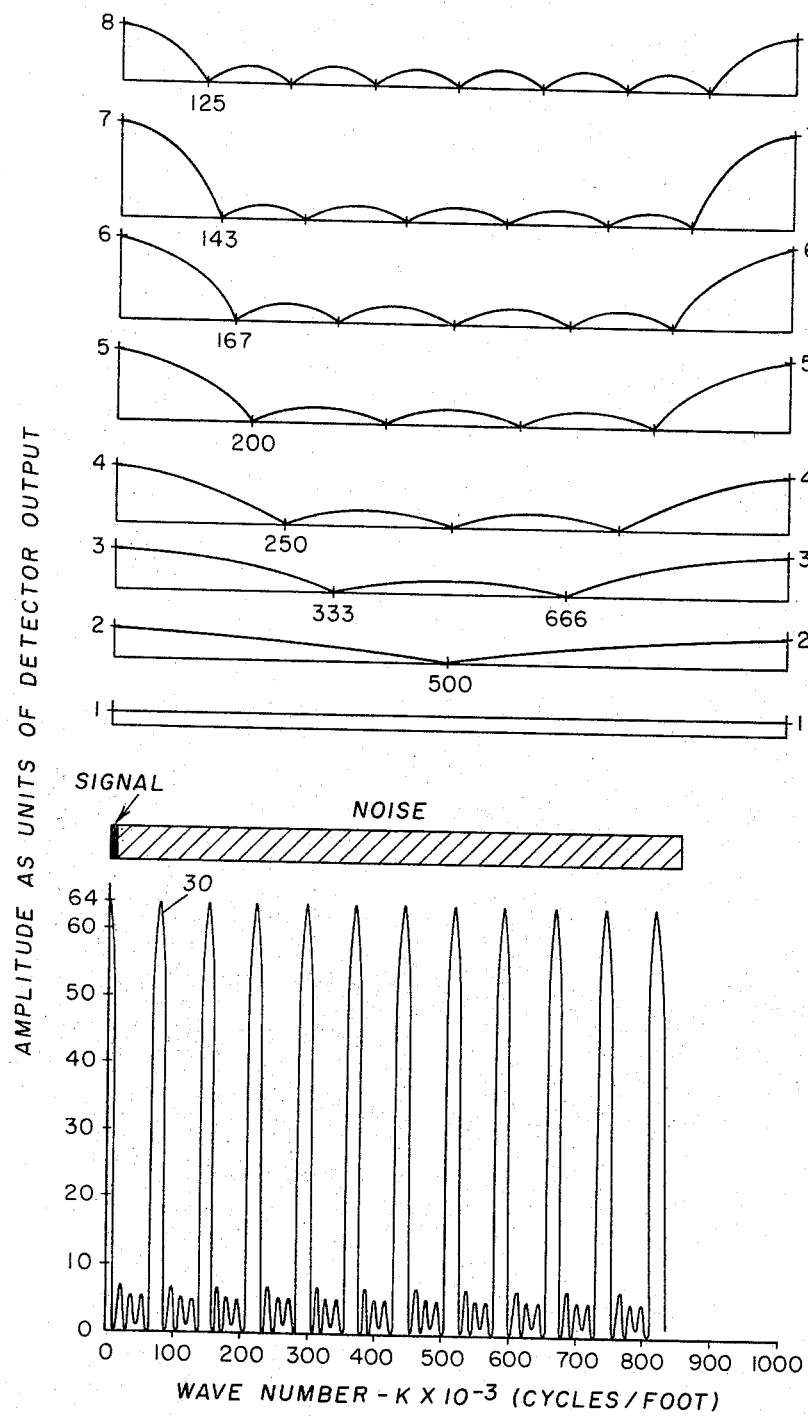
FIGURES 7 through 14 are digital computer calculated plots of the steady-state response curves for each of the subarrays of detectors in the main array for the triangular weighting function of FIGURE 3.
FIGURE 15 is a digital computer calculated plot of the steady-state response curve for the triangular weighting function without subarrays grouped around each weighting point.

*The method of the invention (FIGURES 1 and 2)*

Referring first now to FIGURE 1, there is illustrated a marine seismic hydrophone cable 10 being pulled behind a recording boat 12. As illustrated, and as is usually the case, the hydrophone streamer 10 comprises a plurality of detecting stations spaced end to end with the output of each detecting station being connected by way of a separate conductor in the cable 10 to the input of a multichannel recorder on board boat 12. Thus, when seismic waves are generated at a source location (not shown) by the explosion of dynamite or the detonation of a gas source, reflected waves 14 from subsurface horizons are received at each of the detecting stations along the streamer 10.

The seismic source not only creates downward-going waves for reflection, but also creates horizontally traveling noise which travels down the streamer 10 and interferes with the reception of reflected waves 14. For example, in-line noise wave front W–W' travels along the streamer 10 and causes an interfering output signal as it arrives at each one of the detector stations.

In accordance with my invention, these horizontally traveling noise waves, both high and low frequency components, are attenuated and substantially eliminated by detecting at each station the seismic waves 14 with a weighted main array including a plurality of spaced-apart subarrays as illustrated in FIGURE 2. Since each of the detector stations is identical, only station 16 is illustrated. The station 16 has a sensitivity which varies along its length according to some predetermined weighting function for the purpose of attenuating in-line low frequency, horizontally traveling noise. As prescribed by the predetermined function, station 16, for example, may have a maximum sensitivity at the center near location 18 and taper linearly and uniformly to a minimum at each end of station 16 by a plurality of steps at locations along cable 10. The gross sensitivity of station 16 may be referred to as the main array. Near each one of the step changes in sensitivity for the main array, there is placed a subarray of longitudinally spaced detectors that attenuates the high frequency components of horizontally traveling noise waves.

As the horizontally traveling noise waves move down the spread 10 and at the same time reflected waves 14 arrive at the spread 10, the output signals from each of the detectors in the main array and at each subarray within the main array are combined to produce a single signal representative of the reflected seismic waves and free of the horizontally traveling noise waves of both high and low frequency. The combined signal from the output of each detector station is then recorded in amplitude with respect to time.

*Weighted main array and triangular weighting function (FIGURES 3 and 6)*

The apparatus of my invention involves a seismic detector cable having a sensitivity which varies along its length according to the amplitude of a predetermined, non-uniform weighting function for the purpose of attenuating horizontally traveling noise waves. Several weighting functions are well known in the art, and for a treatment of prior art weighting functions refer to Geophysics, January 1958, page 1, in an article entitled "The Moveout Filter," and to Geophysics, July 1955, page 539, in an article entitled "A New Method of Pattern Shooting."

While many weighting functions may be used in my invention for attenuating horizontally traveling noise waves, I prefer to use an approximation to a weighting function illustrated as curve 25 in FIGURE 3. The equation of curve 25 is given by the portion of $$\frac{\sin \pi x}{\pi x}$$

between $$x = -\frac{1}{k_1} \text{ and } x = +\frac{1}{k_1}$$

where $x$ is the distance from the center of the main array and $k_1$ is the maximum wave number of the reflection signal. The wave number $k$ is simply the inverse of the apparent wavelength of waves in a direction in line with the cable 10. In general, the weighting function can be expressed in terms of $y = f(x)$. As soon as the distance along the array $x$ is specified, $f(x)$ then determines the amplitude of the weighting function at that particular distance along the array. The aforementioned weighting function may be referred to as a truncated sinc function.

When the truncated sinc function 25 is the preferred weighting function to be sampled by an array of detectors, it cannot be sampled by an array of equally spaced groups of detectors having equal gain. A good approximation, however, is achieved by a sensitivity approximating the amplitude of an isosceles right triangle 26 with its apex at the center of the array as illustrated in FIGURE 3. As illustrated, the weighting or sample points approximating the right triangle 26 are equally spaced one from another in one form of the invention. Instead of grouping detectors at these equally spaced placement points as was taught by the prior art, this invention distributes the detectors near each weighting point longitudinally along a detector cable to provide a subarray near each weighting point so as to achieve reduction of high frequency, horizontally traveling noise waves and to achieve better sampling of the noise wave front.

More specifically, and in FIGURES 2 and 3, at the center of main array 16 there is placed at subarray 18 the number of detectors to approximate the maximum amplitude of the right triangle weighting function 26. In one specific embodiment of my invention, sixty-four separate transducers or detectors were used in each main array comprising each detector station. Therefore, subarray 18 has eight detectors. The subarrays 17 and 19, equally spaced on either side of the center subarray 18, contain seven detectors, and so on, tapering linearly toward each end of the main array 16 to one detector.

The physical construction of one form of the invention may be better seen by reference to FIGURE 6, illustrating diagrammatically the center portion of main array 16. Therein, the center subarray along cable 10 is illustrated at 18 and having eight detector elements spaced longitudinally from each other along the cable 10. Subarrays 17 and 19 have seven spaced-apart detectors. All of the detectors in the main array 16 are connected to a signal channel including conductors 28 and 29 inside cable 10 and passing up to the recording boat 12 for input to one channel of a multitrace recorder.

In one embodiment of the invention, each detector element of a high impedance type crystal is placed in a separate boot including conventional stress members. The outputs of all of the crystals in each station are connected in parallel to the signal channel. Each of the subarrays making up the main array 16 is equally spaced apart about 13.5 feet from center to center, and the detectors within each subarray are spaced one foot apart.

*Response of triangular weighted main array (FIGURES 7–17)*

For an illustration of the steady-state response curves produced by the specific embodiment given in the preceding paragraph for the triangular weighted main array, refer now to FIGURES 16 and 17. In both figures, the ordinate is the normalized amplitude of each array and the abscissa is plotted as wave number in cycles per foot where the wave number $k$ is the inverse of apparent wavelength. To find where a specific noise wave falls on the response curve, both its velocity and its frequency must be used to calculate the value of wave number $k$.

FIGURE 16 is the steady-state response curve of a triangular weighted array as illustrated in FIGURE 2 but without subarrays making up the weighting points. FIGURE 16 is the response curve of the triangular tapered array taught by the prior art. Notice that it has a large rebound 30 at .074 wave number, which is the inverse of the spacing between the weighting points or 1/13.5. The response curve of FIGURE 16 also has a fairly large rebound 32 in the center of the rejection band for noise.

For a comparison to the response curve of FIGURE 16 and of the prior art teaching, refer now to FIGURE 17 which is the response curve with a main array tapered according to the right triangular function of FIGURE 3, but composed of spaced-apart subarrays of longitudinally spaced detectors grouped around each weighting point. Notice that the large rebound 30 and the smaller rebound 32 of FIGURE 16 have been completely eliminated as well as certain other small ripples in the rejection band.

Since in marine exploration horizontally traveling noise waves have a velocity of essentially the velocity of sound in water or 5000 feet per second, this fact allows the calculation of the frequency rejection for horizontally traveling noise waves using the response curve of FIGURE 17. If the conventional designation of half-power points for filters is used, the filter cutoff point falls where the response is down 3 db or .707 of its maximum amplitude or at point 35 where the wave number is .003 cycle per foot. If this cutoff wave number is converted into frequency using the water velocity of 5000 feet per second, all horizontally traveling noise waves with a frequency greater than 15 cycles per second are effectively rejected by the filtering process of the main array 16, including the effect of the subarrays making up the main array. The response curve of FIGURE 17 does have a large rebound at $k=1$ cycle per foot, but this corresponds to a frequency of 5000 cycles per second, far above any high frequency noise waves traveling in the water.

For an illustration of the action of the subarrays in attenuating high frequency noise, refer now to FIGURES 7–15 where all the curves in each of the figures are plotted to the same abscissa scale along FIGURE 15. FIGURES 7–14 illustrate the steady-state response of each of the subarrays described above for the preferred embodiment of the invention. For example, FIGURE 7 represents the response of the center subarray 18 which has a maximum amplitude of eight, corresponding to the eight detectors of equal sensitivity and unit output. The response of the subarray 18 as illustrated in FIGURE 7 has notches at equally spaced distances of .125 cycle per foot wave number. The rejection band for the filter response curve of FIGURE 7 extends from about .03 to about .97 cycle per foot wave number.

Consider now the filter response curve illustrated in FIGURE 8 as the filter response of either subarrays 17 or 19 (FIGURE 2). The maximum amplitude of the response curve is seven, corresponding to the seven detectors of unit output, and the curve of FIGURE 8 has notches at .143 cycle per foot wave number. The rejection band for the response curve of FIGURE 8 extends from about .04 to about .96 cycle per foot. The filter responses of each of the remaining subarrays extending outward to the end of the main array where there is one detector with no rejection response are illustrated, respectively, in FIGURES 9 through 14.

Consider now the steady-state filter response, as illustrated in FIGURE 15, of a triangular weighted main array without subarrays as in this invention. FIGURE 15 is a compressed abscissa scale version of the response curve of FIGURE 16 without a normalized ordinate scale. The response curve of FIGURE 15 has a rebound 30 at .074 cycle per foot and multiples thereof. The maximum amplitude of the response curve of FIGURE 15 is sixty-four, corresponding to the sixty-four detector crystals of unit output making up the main array. The most harmful rebound of the response curve is of course rebound 30 referred to previously. The range in frequency of the horizontally traveling noise wave extends from about 15 cycles per second to about a thousand cycles per second. Therefore, each of the rebounds beyond rebound 30, as well as the small ripples between each large rebound, would pass some of the noise waves.

In accordance with this invention, however, the response curve of FIGURE 15 is affected by the filter-response rejection bands of the individual subarrays as illustrated by FIGURES 7–14. Each one of the subarrays contributes to the goal of attenuating some high frequency noise waves to thus reduce the rebound amplitudes of the main array (FIGURE 15) as well as some of the ripples between each large rebound. By inspection of FIGURES 7–15, it may be seen that the rebound 30 is attenuated to a marked degree by each of the response curves for the subarrays. The combined effect of the response curves of the subarrays is to eliminate rebound 30 and ripple 32 (FIGURE 16) in the response curve of this invention as illustrated in FIGURE 17.

By using subarrays of detectors within a main array, the main array may be designed primarily for the purpose of (1) passing reflected waves having an infinite apparent wavelength and almost zero wave number and (2) for rejecting the low frequency noise waves having wave numbers that are very small, on the order of .003 to .03 cycle per foot. This wave number range corresponds to a frequency rejection range of from 15 cycles per second to 150 cycles per second. In designing the main array, the large rebounds are of little concern because they may be eliminated by the response of the subarrays. The subarrays may be designed to attenuate the higher frequency, horizontally traveling noise waves between 150 cycles per second and 5000 cycles per second, corresponding to a wave number range of .03 to 1 cycle per foot.

*Trapezoidal weighted main array (FIGURE 4)*

While the preferred weighting function for use in my invention in a right isosceles triangle, other weighting functions may be used as was stated before. One of these other weighting functions is a trapezoid, as illustrated in FIGURE 4. Here again the centers of each subarray are equally spaced one from another. As will be noted by inspection, the triangular weighting function 40 closely approximates the ideal weighting function 25, the truncated sinc function. With the trapezoidal weighting, sixty detectors are required. In this embodiment, the spacing between subarray centers may still be 13.5 feet and the spacing between the detectors within each subarray about 1 foot.

*Weighted main array with unequally spaced subarrays (FIGURE 5)*

While it is preferred that the centers of each subarray be equally spaced, they may be unequally spaced in alternate embodiments, one of which is illustrated in FIGURE 5. Variable spacing between the centers of the subarrays permits more accurate sampling of the truncated sinc function 25. Using again sixty-four detector elements, truncated sinc function 25 may be drawn with an amplitude of eight, and the distances or respective positions of each subarray may be established graphically by drawing a line from the amplitude of each step change in number of detectors until it intersects the sinc function curve 25. The intersection determines the location for each respective subarray. Therefore, with the unequal spacing between the subarrays, the tapering from the center is linear with respect to uniform decreasing of number of detector elements away from the center, but with unequally spaced subarrays.

No special equipment is needed to practice the invention. Conventional hydrophone cables and detectors may be used. Vector Cable Company, Houston, Tex., for example, is equipped to construct a marine cable in accordance with this invention.

Now that the invention has been completely disclosed and illustrated in its preferred form, including several modifications, those skilled in the art may imagine certain other modifications, still within the true spirit and scope of the invention. It is intended to cover all such modifications as defined by the appended claims.

What is claimed is:

1. A marine seismic detector cable for receiving seismic waves reflected from subsurface horizons comprising:
    a plurality of spaced-apart subarrays of detectors located along said cable, the detectors within each subarray being longitudinally spaced from one another distances such that each subarray acts as a high frequency filter adapted to attenuate high frequency horizontally traveling noise waves over a reject band
    a main detecting array comprised of said subarrays, said main detecting array having an impulse response according to a predetermined nonuniform weighting function to provide a low frequency filter for passing the reflected waves and for attenuating low frequency horizontally traveling noise waves over a reject band which overlaps with the reject bands of said high frequency filters, the number of detectors within each subarray being proportional to the amplitude of said nonuniform weighting function, and
    means for combining the outputs of all of said detectors to produce a single signal representative of the reflected seismic waves and substantially free of horizontally traveling noise waves of both high and low frequency.

2. A cable as in claim 1 wherein said weighting function is the portion of $$\frac{\sin \pi x}{\pi x}$$

between $$x = -\frac{1}{k_1} \text{ and } x = +\frac{1}{k_1}$$

where $x$ is the distance from the center of the main array and $k_1$ is the maximum wave number of the reflection signal.

3. A cable as in claim 1 wherein said weighting function is an isosceles right triangle with its apex at the center of said main array.

4. A cable as in claim 1 wherein said weighting function is a trapezoid which is symmetrical about the center of said main array.

5. A cable as in claim 1 wherein the centers of said subarrays are equally spaced from each other and the detectors within each subarray have equal sensitivity and are equally spaced from each other.

6. A cable as in claim 5 wherein the spacing between the centers of said subarrays is about 13.5 feet, the number of detectors within each subarray varies from eight at the center of the main array tapering linearly to one at each end of said main array, and the spacing between the centers of the detectors within each subarray is about one foot.

7. In a marine seismic detector cable, an improved detector arrangement comprising:
    a plurality of spaced-apart subarrays of detectors located along said cable, the detectors within each subarray being longitudinally spaced from one another distances such that each subarray acts as a high frequency filter adapted to attenuate high frequency horizontally travelling noise waves over a reject band,
    a main detecting array comprised of said subarrays, said main detecting array having an impulse response which is a maximum at the center of said main detecting array and tapers linearly to a minimum at each end of said main detecting array to provide a low frequency filter for passing the reflected waves and for attenuating low frequency horizontally traveling noise waves over a reject band which overlaps with the reject bands of said high frequency filters, the number of detectors within each subarray being proportional to the amplitude of said impulse response, and
    means for combining the outputs of all of said detectors to produce a single signal representative of the reflected seismic waves and substantially free of horizontally traveling noise waves of both high and low frequency.

8. In a method of marine seismic exploration in which seismic waves, generated downwardly from a source location, are reflected from subsurface horizons and are received at a detector cable along with horizontally traveling noise waves, the improvement comprising:
    detecting the received waves with a plurality of spaced-apart subarrays of detectors located along said cable, the detectors within each subarray being longitudinally spaced from one another distances such that each subarray acts as a high frequency filter to attenuate high frequency horizontally traveling noise waves over a reject band, said subarrays forming a main detecting array having an impulse response according to a predetermined nonuniform weighting function to provide a low frequency filter for passing the reflected waves and for attenuating low frequency horizontally traveling noise waves over a reject band which overlaps with the reject bands of said high frequency filters, the number of detectors within each subarray being proportional to the amplitude of said nonuniform weighting function,
    combining the outputs of all of said detectors to produce a single signal representative of the reflected seismic waves and substantially free of horizontally traveling noise waves of both high and low frequency, and
    recording the amplitude of said single signal with respect to time.

References Cited

UNITED STATES PATENTS

| | | | |
|---|---|---|---|
| 2,465,696 | 3/1949 | Paslay | 181—.5 |
| 2,747,172 | 5/1956 | Bayhi | 181—.5 |
| 2,906,363 | 9/1959 | Clay | 181—.5 X |

SAMUEL FEINBERG, *Primary Examiner.*

BENJAMIN A. BORCHELT, *Examiner.*

P. A. SHANLEY, *Assistant Examiner.*